2,816,287

TETRACHLOROETHYLENE ESTERS OF CARBONIC, CHLOROCARBONIC AND OXALIC ACIDS

Ellsworth K. Ellingboe, Highland Woods, and Lester Russell Melby, Wilmington, Del., assignors to E. I. du Pont de Nemours and Company, Wilmington, Del., a corporation of Delaware No Drawing. Application July 1, 1955,
Serial No. 519,645

7 Claims. (Cl. 260—340.2)

This invention relates to new organic compounds which contain only carbon, oxygen, and chlorine.

Chlorinated compounds possess considerable utility as solvents and as chemical intermediates. Cyclic compounds containing chlorine have pesticidal applications. Chlorine-containing compounds are generally less volatile and more resistant to combustion than the corresponding non-halogenated compounds and are useful as flame retardants.

This invention has as an object the preparation of new organic compounds. A further object is the provision of intermediates. Another object is the provision of solvents. Other objects will apepar hereinafter.

These objects are accomplished by the present invention of esters of tetrachloroethylene glycol with carboxylic acids of up to two carbon atoms of the class consisting of carbonic, chlorocarbonic, and oxalic acids. In these compounds the tetrachloroethylene dioxy unit, i. e., —$OCCl_2CCl_2O$—, is attached to the carboxy carbon of carbonic, chlorocarbonic, and oxalic acid. These esters contain only carbon, oxygen, and chlorine.

These new compounds, tetrachloroethylene carbonate, chlorocarbonate, and oxalate, are obtained by the substitution chlorination of ethylene carbonate, chlorocarbonate, and oxalate in the presence of sufficient actinic light and at least four moles of chlorine per —$CH_2CH_2$— unit at an elevated temperature to effect replacement of all the hydrogens by chlorine, i. e., until the yellow color of residual chlorine persists for thirty minutes without fresh addition of chlorine.

The following examples in which parts are by weight are illustrative of the invention.

EXAMPLE I

*Synthesis of tetrachloroethylene carbonate*

A mixture of 88 g. (1 mol) of ethylene carbonate and 200 ml. of carbon tetrachloride was placed in a one-liter three-necked borosilicate glass flask equipped with a stirrer, reflux condenser, thermocouple well and sub-surface gas inlet of coarse sintered glass. Chlorine was introduced through the gas inlet tube at a moderate rate while the mixture was stirred and irradiated with two 275-watt RS sun lamps at close range. The temperature of the mixture rose rapidly to the boiling point bout 75° C., and the refluxing rate was controlled by adjusting the rate of chlorine addition. Chlorine was absorbed, and hydrogen chloride escaped through the water-cooled condenser. The reaction mixture was cloudy at the start but cleared to a single liquid phase after about ten hours. Chlorine was added at a slow rate until the development of a yellow color indicated that chlorine was not being completely absorbed. This occurred after about thirty hours, and the temperature at this point was about 80° C. The yellow color was not permanent, since it disappeared within a few minutes when the flow of chlorine was stopped. Accordingly, the addition of chlorine was resumed at a rate which maintained the yellow color and periodic tests were made to determine if the color was permanent. After fifty hours, during which a total of 350 g. (4.93 mols) of chlorine had been passed into the reaction mixture, the yellow color was found to persist for 30 minutes without the addition of more chlorine, and the reaction was judged complete. The mixture was then fractionated at atmospheric pressure to remove most of the carbon tetrachloride, and finally under reduced pressure to yield a colorless liquid product; B. P. 46° C. at about 5 mm., wt. 196.7 g., $n_D^{25}$, 1.4682. The product was identified as tetrachloroethylene carbonate by analysis (calculated for Cl: 62.80%; found: 62.82%), and by reaction with aniline in carbon tetrachloride to yield a mixture of oxanilide, M. P. 255° C.–257° C. (open block method), and carbanilide, M. P. 246° C.–247° C. (open block method).

The above general procedure was repeated except that 176 g. (2 mols) of redistilled ethylene carbonate in 400 ml. of carbon tetrachloride was chlorinated at refluxing temperature in a 2-liter three-necked flask. In this experiment chlorine was added as rapidly as possible without flooding the reflux condenser. At the end of ten hours about 900 g. (12.7 mols) of chlorine had been introduced, the reaction temperature was about 85° C., and a color-persistance test indicated that the chlorination was complete. The reaction mixture was distilled to yield 436.2 g. of product boiling at 50°/10 mm. A repurified sample obtained by careful fractionation yielded the following analytical data: B. P. 52°/7 mm., 165° C./760 mm. by the Emich micro method; $n_D^{25}$, 1.4683; $d_{25}$, 1.7059; $M_D$, calculated 36.59%, found 36.82%; calculated for Cl: 62.82%; found 62.79%.

EXAMPLE II

*Synthesis of tetrachloroethylene oxalate*

Ethylene oxalate was prepared by the method of Carothers, Arvin and Dorough, J. Am. Chem. Soc. 52, 3292 (1930). A mixture of 146 g. (1 mol) of diethyl oxalate and 62 g. (1 mol) of ethylene glycol was heated at 180° C.–190° C. in a Claisen-type distillation apparatus until ethanol ceased to be driven off. The ethanol collected weighed 76.4 g. (83% of the theoretical amount). The residue was heated under reduced pressure and a total additional distillate of 21.4 g. was collected at boiling points up to 100° C./0.5 mm. The residual product was a white tacky soft polymer.

The crude polymeric ethylene oxalate was mixed with 400 ml. of carbon tetrachloride, heated to reflux temperature, and chlorinated under irradiation by two 275-watt RS sun lamps at close range. Throughout the chlorination there was little change in the nature of the reaction mixture, which consisted of a dispersion of semisolid insoluble material in a fluid solvent matrix. Chlorine was absorbed, however, and hydrogen chloride was evolved. A total of 480 g. (6.76 mols) of chlorine was introduced over a reaction period of 32 hours before a yellow-color-persistance test indicated that the reaction was complete. Upon removal of carbon tetrachloride under reduced pressure, a soft wax-like white residual product was obtained in a yield of 256.3 g. This product was nearly insoluble in carbon tetrachloride, but was about 80% soluble in chloroform. It reacted slowly with water to form dilute hydrochloric acid and gaseous products, with eventual complete dissolution. It also reacted vigorously with aniline in carbon tetrachloride to form oxanilide, with no evidence of carbanilide as a by-product. Analysis: Calculated for $C_4Cl_4O_4$, Cl, 55.9%. Found: Cl, 62.30%. This analysis indicates that the crude ethylene oxalate was contaminated, most probably by ethoxyl end-groups due to incomplete ester interchange.

EXAMPLE III

Synthesis of tetrachloroethylene bis-chlorocarbonate

Complete chlorination of ethylene bis-chloroformate was carried out under sun lamp irradiation according to the method of Examples I and II, with modifications to permit a higher reaction temperature and to avoid wastage of chlorine. A 1-l. borosilicate glass reactor, fitted with a double reflux condenser consisting of a water-cooled lower portion and a "Dry-Ice" cooled upper portion, was charged with 374 g. (2.0 mol) of ethylene bis-chloroformate and the temperature was brought to 80° C. by irradiation at close range with two 275-watt RS sun lamps. Chlorine was then introduced and the temperature allowed to rise to 120° C. The temperature was kept at this level by (1) adjusting the chlorine input slightly below the point at which a yellow condensate of free chlorine appeared in the "Dry-Ice" cooled reflux condenser and (2) moving the sun lamps to an appropriate distance from the reactor. The reaction was judged complete when a definite excess of refluxing chlorine failed to diminish in 30 minutes after addition through the inlet tube was stopped. A total of 586 g. (8.25 mole) of chlorine was added over a period of 27 hours. The reaction mixture solidified on cooling to room temperature, and the yield of crude product, after removal of excess chlorine, was 621.6 g. The product was crystallized from cyclohexane to form hard, flat prisms, M. P. 99° C.–99.5° C. Analysis: Calculated for $C_4Cl_6O_4$: Cl, 65.5%; found, 64.58%.

The new products of this invention are the tetrachloroethylene esters of the 1 to 2 carbon carboxylic acids, carbonic, chlorocarbonic, and oxalic. The cyclic compounds are represented by the formula

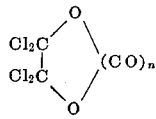

where $n$ is a positive integer from one to two. Although both the carbonate and oxalate can be represented by the above structural formula, the oxalate also exists as a polymeric material having the repeating unit

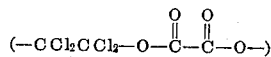

i. e., in the monomeric ester and the polymeric ester the unit is as thus formulated. The tetrachloroethylene glycol ester of chlorocarbonic acid has the structural formula

The compounds of this invention are obtained by the replacement of all of the hydrogens of ethylene carbonate, chlorocarbonate or ethylene oxalate with chlorine. This is accomplished by the use of at least four moles of chlorine per ethylene unit in the ester and until chlorine persists for thirty minutes after cessation of chlorine addition, at a temperature of at least 50° C., and with irradiation by light particularly in the 2000–4000 Angstrom range. Chlorination to monochloroethlene derivatives is relatively easy. Even the dichloro derivatives can be obtained without much difficulty. For the complete chlorination it is necessary to have an excess of chlorine present with sufficient actinic light to catalyze the replacement of all the hydrogens. An effective and strong source of actinic light is a requirement of the process for the production of the compounds of this invention. Although sunlight can be used it is preferred that a source be employed that is more concentrated with respect to the wave lengths that activate chlorine substitution. Particularly useful are mercury vapor lamps or sun lamps which emit a substantial amount of light within the region of 2000–4000 Angstroms. When borosilicate glass is employed as the reaction vessel with an external light source, the most effective wave lengths of light are above 3000 A.

The temperature employed in the chlorination is usually at least 50° C. and can be as high as 125° C. The higher the temperature, the shorter the time necessary for complete chlorination. Preferably the temperature is within the range of 75° C.–120° C. The time involved is also dependent upon the relative amounts of actinic light and the ester being subjected to chlorination. Thus, a relatively large batch requires considerably longer time than a small amount unless the illumination is increased in proportion. Thin layers of reactants subjected to chlorination give faster and more complete chlorinations. For noncontinuous preparations the time involved is generally within the range of an hour to three days or longer.

Chlorine, which under the conditions of the reaction is gaseous or dissolved in the reaction medium, must be employed in excess to assure complete substitution for hydrogen. The amount of chlorine introduced is at least 4 moles per mole of ethylene carbonate, chlorocarbonate or oxalate. The amount of chlorine introduced is generally more than this since there is usually a physical loss of some of the chlorine. The completion of the chlorination can be determined by the weight gain of the ester, provided none is carried out by effluent hydrogen chloride or by evaporation. The completion of the chlorination reaction is most effectively determined by the persistence of dissolved chlorine (as seen by its yellow color) after chlorine introduction is stopped in the presence of actinic light.

The chlorination is carried out in a liquid medium. The use of nonreactive solvents is particularly desirable when a nonliquid ethylene ester such as ethylene oxalate is being chlorinated. Solvents such as carbon tetrachloride are generally employed. Higher boiling solvents, such as trichlorobenzene, can be used, and are particularly advantageous when higher temperatures of chlorination with correspondingly decreased times are desired.

The reaction is carried out in apparatus that is resistant to chlorine and hydrogen chloride and has a means of introducing actinic light. In general, the apparatus is of borosilicate glass or quartz or has windows or other means for the transmission of actinic light into the reaction mixture. Although superatmospheric pressure can be employed, the equipment required for such operation is usually more expensive and generally not necessary.

The perchloroethylene esters of the one to two carbon carboxylic acids are stable under neutral and acidic conditions. Perchloroethylene carbonate is a liquid which can be used as a solvent for organic materials, such as natural fatty oils, under these conditions. The esters react with hydrogen bearing amines. As shown in the examples, reaction with aniline gives anilides. Reaction with diamines such as hexamethylenediamine gives polymeric amides which are useful in the preparation of fibers of the nylon type, as is disclosed in greater detail in copending application Serial No. 519,644, filed July 1, 1955 by E. K. Ellingboe. The perchloroethylene ester of oxalic acid on treatment with a tertiary amine is converted to oxalyl chloride as is set forth in greater detail in copending application Serial No. 519,643, filed July 1, 1955, by E. K. Ellingboe and L. R. Melby. Perchloroethylene carbonate on treatment with a tertiary amine gives both phosgene and oxalyl chloride.

Under basic conditions, these esters react with hydroxyl groups and hydrogen bearing amino groups. Accordingly, they can be used to crosslink amino- or hydroxyl-containing polymers, e. g., aminoethylmethacrylate polymers or polyvinyl alcohol polymers and cellulosic derivatives.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for the preparation of tetrachloroethylene oxalate which comprises passing chlorine into ethylene oxalate illuminated with actinic light at reflux temperature until the yellow color of free chlorine persists in the reaction mixture for 30 minutes after cessation of chlorine addition followed by isolating the tetrachloroethylene oxalate.

2. Process which comprises passing chlorine into a neutral ethylene glycol ester of the class consisting of ethylene carbonate, ethylene bis-chlorocarbonate, and ethylene oxalate illuminated with actinic light of wave length in the 2000–4000 Angstrom range and maintained at at least 50° C. until the yellow color of free chlorine persists in the reaction mixture for 30 minutes after cessation of chlorine addition and isolating the tetrachloroethylene ester.

3. Process of claim 2 wherein the ester chlorinated is maintained at 75° C.–120° C.

4. Tetrachloroethylene oxalate.

5. Tetrachloroethylene carbonate.

6. A tetrachloroethylene ester of an acid of the class consisting of carbonic, chlorocarbonic, and oxalic acids.

7. Process for the preparation of tetrachloroethylene carbonate which comprises passing chlorine into ethylene carbonate illuminated with actinic light at reflux temperature until the yellow color of free chlorine persists in the reaction mixture for 30 minutes after cessation of chlorine addition followed by isolating the tetrachloroethylene carbonate.

References Cited in the file of this patent

UNITED STATES PATENTS 2,711,997     Trieschmann et al.     June 28, 1955

FOREIGN PATENTS 875,648     Germany     May 4, 1953
237,387     Switzerland     Aug. 1, 1945

OTHER REFERENCES

Newman et al.: JACS, vol. 75, pp. 1263–64 (1953).